Figure 3:
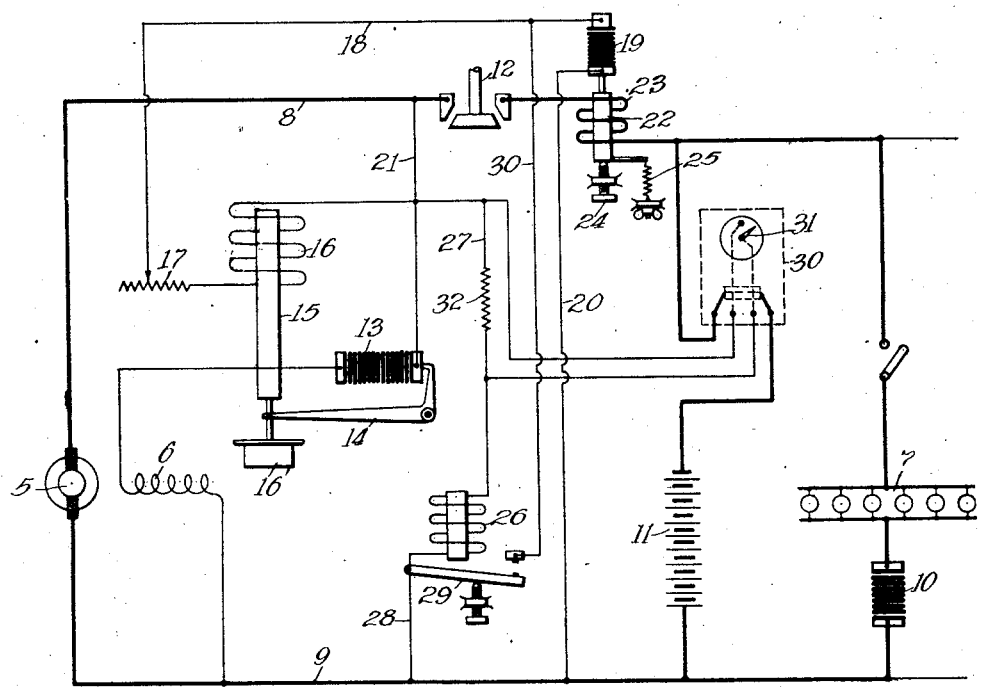

W. A. TURBAYNE.
SYSTEM OF ELECTRICAL REGULATION.
APPLICATION FILED FEB. 11, 1915. RENEWED MAR. 1, 1920.
1,355,869.
Patented Oct. 19, 1920.
2 SHEETS—SHEET 1.
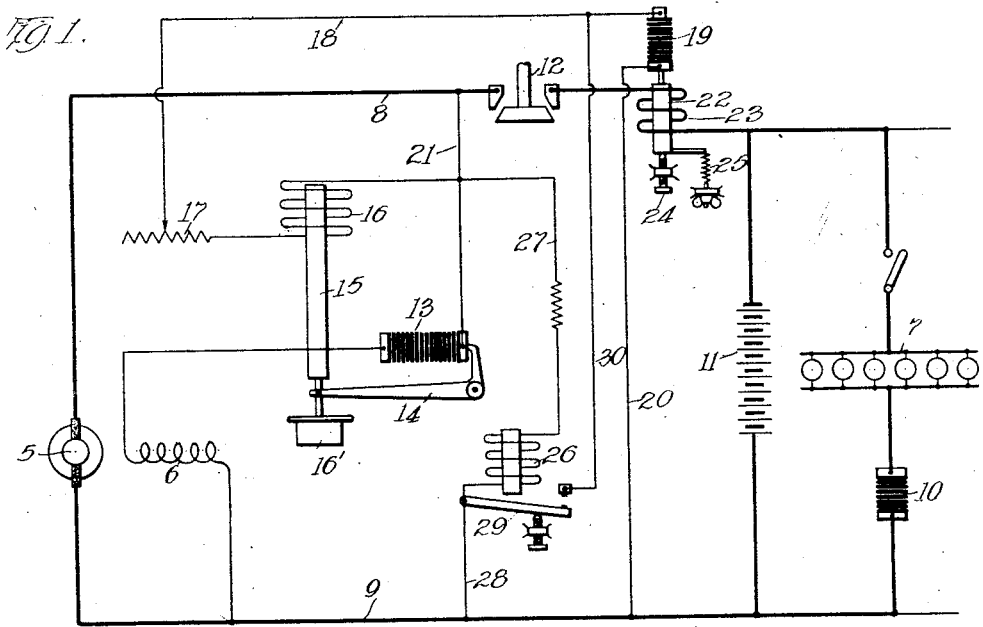
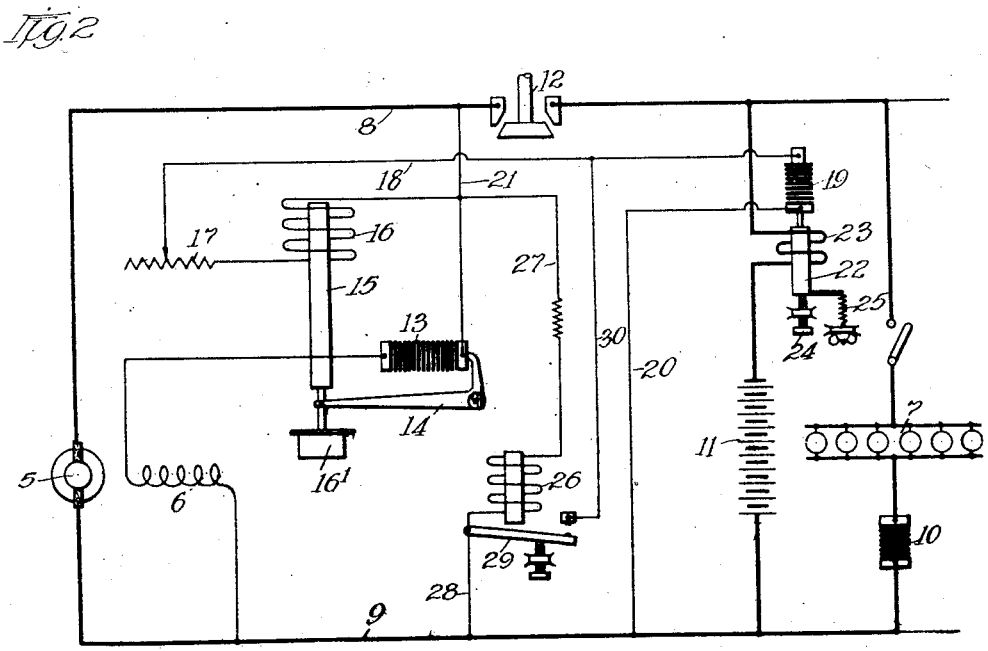
Witnesses:
Inventor
William A. Turbayne.
By Edwin B. H. Tower Jr.
Atty.

W. A. TURBAYNE.
SYSTEM OF ELECTRICAL REGULATION.
APPLICATION FILED FEB. 11, 1915. RENEWED MAR. 1, 1920.

1,355,869.

Patented Oct. 19, 1920.
2 SHEETS—SHEET 2.

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

SYSTEM OF ELECTRICAL REGULATION.

1,355,869.     Specification of Letters Patent.     Patented Oct. 19, 1920.

Application filed February 11, 1915, Serial No. 7,588. Renewed March 1, 1920. Serial No. 362,548.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Regulation, of which the following is a full, clear, concise, and exact description, reference being had to the accompanying drawing, forming a part of this specification.

This invention relates to systems of electrical regulation.

The invention is especially applicable to the regulation of variable speed generators such as are used in railway and automobile lighting systems wherein a generator is employed to charge a storage battery and supply a lamp or other load. When the generator is at rest or operating at a low speed, the battery supplies the load.

In such systems it is often desirable to regulate the generator in response to total generator current or battery current, until predetermined electrical conditions have been attained, and thereafter to regulate so as to maintain a substantially constant voltage.

An object of the present invention is to provide a regulator for a variable speed generator which will maintain constant current under certain conditions and constant voltage under other conditions in which the constant voltage regulation is uninfluenced by variations in the generator current.

Another object is to provide a regulator for variable speed generators which will permit the generator to deliver maximum output uninfluenced by the regulator until a predetermined maximum current is reached and which will thereafter hold said maximum current at a practically constant value.

Another object of the invention is to provide a current regulator for the generator in systems employing a storage battery, which has improved means to prevent battery discharging current from preventing the proper building up of the generator.

Another object of the invention is to provide an improved regulator for variable speed generators which will cause the generator to rapidly build up so as to deliver its maximum output at relatively low speeds.

Another object is to provide a current regulator of increased sensitiveness which may be readily adjusted.

The accompanying drawings illustrate embodiments of the invention, although it is obvious that many changes may be made in the construction or arrangement of parts without departing from the invention.

The three figures of the drawing illustrate diagrammatically three embodiments of the invention.

Figure 1 illustrates a generator provided with an armature 5 and a shunt field winding 6, which supplies lamps 7 through the generator leads 8 and 9. A suitable lamp regulator, herein illustrated diagrammatically as a compressible rheostat 10, may be employed, if desired.

A storage battery 11 is connected in parallel with the lamps across the leads 8 and 9.

An automatic switch 12 is provided between the generator and storage battery and lamps to prevent the battery from discharging through the generator when the voltage of the latter falls below that of the battery.

Regulation of the generator is accomplished by varying the pressure on the compressible rheostat 13 in series with the shunt field winding, by means of the bell crank lever 14, operated by a core 15 of a solenoid 16. The solenoid 16 is arranged so that the weight of the core is normally exerted in compressing the rheostat 13 in order that the current flowing through the shunt field 6, during the building up of the generator, shall be a maximum. The core 15 may be steadied by a dash-pot 16', if desired. The coil of the solenoid 16 is connected across the main leads 8 and 9, through an adjustable resistance 17, conductor 18, an auxiliary compressible rheostat 19 and conductor 20 to the positive generator lead, and is connected to the negative generator lead by conductor 21. The coil 16 is therefore normally connected as a voltage coil, having in series therewith an adjustable resistance 17 and a variable resistance 19.

The auxiliary compressible rheostat 19 is controlled by the movement of the plunger 22 which forms the core of a solenoid 23 connected in series in the generator lead 8, between the automatic switch and the battery and lamp circuits. Variations in the resistance of the rheostat 19 will control the current in the solenoid 16. The core of solenoid 23 normally rests in its lowermost position against an adjustable stop 24, due to the action of gravity, assisted, if desired, by an adjustable spring 25, so that the resistance of the rheostat is normally a maximum and the current permitted to flow in the coil 16 is a minimum.

The rheostat 19 is rendered ineffective under predetermined conditions by a short-circuiting means operated by a voltage relay. The relay has a coil 26 connected in shunt across the generator leads, through conductors 21, 27 and 28. When the relay operates, its armatures 29 is attracted and closes a short-circuit 28, 29 and 30, around the auxiliary rheostat 19. The relay is adjustable so that it may be set to respond to a predetermined voltage on the system.

The operation of the system is as follows. Starting with the generator at rest, the automatic switch will be open and consequently the coil 23 will be deënergized so that the rheostat 19 will cause the energization of the coil 16 to be a minimum. The rheostat 13 will therefore be fully compressed so that the generator field resistance is a minimum, thus causing the generator to rapidly build up and to deliver maximum output at a low speed. When a generator voltage is reached which is substantially equal to the battery voltage, the automatic switch closes. Current now flows through the load circuits, passing through the coil 23 of the rheostat 19. This rheostat is so set that the plunger is not raised by the coil until a predetermined output of the generator is attained, which represents the maximum output which it is desired to permit, so that up to this point the generator is uninfluenced by the regulator and is free to develop its full output. Upon tendency to exceed the maximum output for which the regulator is adjusted, the auxiliary rheostat will act to decrease the resistance in series with the rheostat operating coil 16, so that the main regulator will respond to vary the field excitation and hold this maximum current value constant. This current value cannot therefore be exceeded, regardless of variations in generator speed or electrical conditions of the system.

The continued charging of the battery causes a gradual rise in the voltage of the system, due to the gradually rising C. E. M. F., of the battery. When the voltage reaches a predetermined value, the voltage relay coil 26 becomes sufficiently energized and attracts its armature 29, thus short-circuiting the auxiliary rheostat 19. Thereafter the current coil 23 is ineffective to control the regulation and the coil 16, alone, connected across the system, acts to hold constant potential upon the generator. The standard of regulation may be varied by varying the resistance 17 to hold any desired voltage on the system. In practice, this voltage is generally that which will cause a fully charged battery to float across the line.

Fig. 2 illustrates a modification in which the coil 23 is connected in the battery lead. This provides for current regulation of the generator in response to battery current and thus holds a constant charging current until a predetermined voltage is reached, at which point the voltage relay operates as described in connection with Fig. 1. In this modification the generator current will be permitted to vary to take care of variations in the lamp load.

Fig. 3 represents a further modification in which an ampere hour meter 30 is employed to determine the point at which the voltage regulator shall become effective. The ampere hour meter is connected in the battery lead and measures the charge and discharge of the battery. This meter is preferably of the type which will run faster on discharging current than on charging current, so as to compensate for battery inefficiency. The meter is provided with an indicating dial having a movable pointer 31 which indicates at all times the amount of charge remaining in the battery. When this pointer indicates a substantially fully charged condition of the battery, it completes a local circuit which causes the voltage relay to operate as described in Fig. 1. This local circuit controls the operation of the relay by short-circuiting a resistance 32 in series with the coil 26 of the relay. The value of this resistance is sufficiently great to prevent the voltage relay operating at any voltage which may be reached in the normal operation of the system. When this resistance is short-circuited, however, the relay coil receives sufficient current to operate and thus render inoperative the current regulating means, as described in Figs. 1 and 2.

By the provision of the auxiliary rheostat 19, generator current does not directly affect the plunger of the main regulator. The auxiliary rheostat may, therefore, be made relatively small and of great sensitiveness. The weight of the parts and the adjustment of the spring is such that no movement of the operating plunger is brought about until the maximum normal output of the generator is reached. Consequently, the generator will be caused to rapidly build up and to deliver its full output at a relatively low speed, unopposed by any operation of the regulator.

Where the system is regulated for total generator output, as in Fig. 1, discharging current from the battery through the lamps does not flow through the series coil and will therefore have no effect on the regulator.

When the system is arranged to regulate in response to battery current, as in Fig. 2, the auxiliary regulator is so adjusted that current from the battery to supply the normal lamp load is insufficient to raise the plunger of the auxiliary regulator and therefore, in this modification, discharging battery current has no effect on the regulator.

It is to be understood that the embodiments of the invention herein described are merely for the purposes of illustration, and that many modifications in construction and arrangement of parts may be made without departing from the invention, the scope of which is defined in the appended claims.

What I claim as new and desire to secure by Letters Patent of the United States is:—

1. An electrical system of generation and regulation including a variable speed generator, a regulating medium for controlling the field thereof, said regulating medium being controlled by an electro-magnetic winding normally connected across said system, means whereby said winding may be rendered responsive to current changes in the system, and means for cutting out said last mentioned means whereby said winding may be rendered responsive to voltage changes of the system.

2. A regulator for a variable speed generator including, in combination with the generator field, a regulating medium for varying the excitation of said field, means connected across said generator for controlling said medium, current responsive means adapted to cause said first mentioned means to regulate in response to current variations under predetermined conditions, and means for cutting out said current responsive means whereby said first mentioned means may be rendered responsive to voltage changes.

3. A regulator for a variable speed generator including, in combination with the generator field, a regulating medium for varying the excitation of said field, means connected across said generator for controlling said medium, current responsive means adapted under predetermined conditions to cause said first mentioned means to regulate in response to current variations, and means whereby said current responsive means is prevented from influencing said regulation under certain conditions.

4. In a car lighting system, a variable speed generator and regulating means therefor, said means normally connected across said system, current responsive means adapted to control said first mentioned means upon a predetermined generator output, said current responsive means being prevented from influencing said regulator when the generator output is below said predetermined value, and voltage responsive means for nullifying said current responsive means.

5. In a car lighting system, a variable speed generator and regulating means therefor, said means having a means connected across the system and a current responsive means adapted to control said first mentioned means upon the attainment of a predetermined generator output, and means to prevent said current responsive means from affecting the regulation after a predetermined voltage on the system is reached.

6. In a car lighting system, a variable speed generator, current responsive means for controlling said generator upon the attainment of a predetermined current output, said current responsive means including a winding connected across the system, said means being prevented from affecting the generator output at current values below said predetermined output, and means for altering the mode of operation of said current responsive means upon the attainment of a predetermined electrical condition.

7. In combination, a variable speed generator, a storage battery to be charged thereby, a winding connected across said generator, a current responsive regulator for controlling the action of said winding, and means for rendering said current responsive regulator inoperative when a predetermined electrical condition is attained.

8. In combination, a variable speed generator, a storage battery to be charged thereby, a winding connected across said generator, current responsive means causing said winding to respond to current delivered by the generator, and means depending on the state of charge of the battery for rendering said current responsive means ineffective to control said winding.

9. In a car lighting system, a variable speed generator and regulating means therefor, said means operating in response to current variations in the system to maintain a predetermined current value constant, said means including a winding connected across said system, and means for rendering part of said current responsive means inoperative and permitting said winding to assume control of the regulator.

10. In an electrical system, in combination, a variable speed generator, means connected across said generator adapted to control the regulation thereof, a current controlled rheostat in series with said means to control same to produce a constant current characteristic, and means responsive to a characteristic of the system for removing said rheostat from effective circuit.

11. In an electrical system, in combination, a variable speed generator, means connected across said generator adapted to control the regulation thereof, and means responsive to the current value in a circuit supplied by said generator, said latter means being adapted to be connected in or disconnected from effective series circuit with said first means.

12. In an electrical system, in combination, a variable speed generator, means connected across said generator adapted to control the regulation thereof, a storage battery, rheostatic means responsive to the current value in a circuit of said system, and relay means adapted to connect said second mentioned means in or disconnect said second mentioned means from effective series circuit with said first mentioned means.

In witness whereof, I have hereunto subscribed my name in the presence of two witnesses.

WILLIAM A. TURBAYNE.

Witnesses:
E. R. KING,
R. H. VAN NEST.